United States Patent Office 3,070,638
Patented Dec. 25, 1962

3,070,638
PREPARATION OF AROMATIC HYDROCARBONS
Sterling E. Voltz, Media, Pa., assignor to Sun Oil Company, Philadelphia, Pa., a corporation of New Jersey
No Drawing. Filed July 20, 1960, Ser. No. 44,000
4 Claims. (Cl. 260—668)

This invention relates to a method for preparing aromatic hydrocarbons from cyclododecatriene-1,5,9.

It is known that cyclododecatriene-1,5,9 can be prepared by contacting butadiene with a catalyst formed from titanium tetrachloride and diethyl aluminum chloride in a hydrocarbon solvent. This catalyst system produces the trans-trans-cis form of the triene exclusively. It is also known that cyclododecatriene-1,5,9 can be prepared by contacting butadiene with a catalyst system which is aluminum triethyl together with either chromyl chloride or chromic chloride in a hydrocarbon solvent. The latter type of catalyst system produces mainly the trans-trans-trans form of the triene but also causes the formation of substantial amounts of the trans-trans-cis isomer.

The present invention provides a method of converting either isomeric form of cyclododecatriene-1,5,9 into a variety of aromatic hydrocarbons. The products obtained can include alkyl benzenes, tetralins, indanes, indenes, naphthalenes and acenaphthenes.

According to the invention, cyclododecatriene-1,5,9 is contacted in vapor phase at a temperature in the range of 200–600° C. with a solid granular catalyst, whereby reaction occurs and aromatic hydrocarbons are obtained as product. Several different types of catalyst can be used to effect this reaction. One suitable type comprises the acidic siliceous cracking catalysts, such as silica-alumina, silica-magnesia, silica-zirconia and acid treated clays. Catalysts which are particularly useful in practicing the invention are chromia-alumina and molybdenum oxide-alumina. Another suitable type comprises the platinum-almina acatalysts which are widely used in reforming operations. Still another suitable catalyst is cobalt molybdate.

Suitable space velocities for effecting contact of the cyclododecatriene with any of these catalysts lie in the range of 0.2–5.0 liquid volumes of cyclododecatriene per bulk volume of catalyst per hour. More preferably, a space velocity in the range of 0.5–3.0 is used. Preferred temperature ranges vary with the catalyst selected. Using acidic siliceous cracking catalysts a temperature of 250–400° C. is preferred. With chromia-alumina the preferred temperature is 300–500° C., and with platinum-alumina 300–450° C.

The liquid product obtained by reacting cyclododecatriene under the above-described conditions is essentially all composed of aromatic hydrocarbons most of which have twelve or less carbon atoms per molecule. Most of the product generally comprises naphthalenes, indenes, indanes and tetralins. Under certain conditions minor amounts of alkyl benzenes are formed, while under other conditions the formation of alkyl benzenes can be substantially avoided if desired. Small amounts of gas and coke are formed in the reaction.

The following specific examples illustrate various conditions for carrying out the present proces and show how the distribution of aromatic products varies with changes in catalyst and conditions of operation.

EXAMPLE I

A commercial silica-alumina cracking catalyst was used to promote the reaction of cyclododecatriene-1,5,9 at three different temperature levels, namely, 300°, 400° and 500° C. The catalyst was packed in a continuous flow reactor and the cyclododecatriene, which had been heated to the desired temperature, was fed through the catalyst bed at about atmospheric pressure and at a space velocity of 2.0. The liquid product was condensed in a cold trap and uncondensible gas was separately collected. Results of analysis of the liquid product by low voltage mass spectrometry are shown in Table I.

Table I
REACTION OF CYCLODODECATRIENE-1,5,9, OVER SILICA-ALUMINA CATALYST

| Run No. | Reaction temp., °C. | Gas make, weight percent | Coke make, weight percent | Number of carbon atoms (n) | Liquid product composition, vol. percent — Generic formula | | | | |
|---|---|---|---|---|---|---|---|---|---|
| | | | | | $C_nH_{2n-6}$ | $C_nH_{2n-8}$ | $C_nH_{2n-10}$ | $C_nH_{2n-12}$ | $C_nH_{2n-14}$ |
| A | 300 | 1.5 | 3.5 | 9 | 2.0 | | | | |
| | | | | 10 | 0.6 | 2.5 | | | |
| | | | | 11 | | | | | |
| | | | | 12 | 4.6 | 55.2 | 19.1 | 6.2 | 4.4 |
| | | | | 13 | | 2.4 | 1.8 | 0.6 | 0.7 |
| B | 400 | 4.7 | 2.6 | 8 | 1.7 | | | | |
| | | | | 9 | 3.7 | | | | |
| | | | | 10 | 1.1 | 3.4 | | | |
| | | | | 11 | | | | 0.7 | |
| | | | | 12 | 4.5 | 51.3 | 13.7 | 10.2 | 4.5 |
| | | | | 13 | | 3.0 | | 1.3 | 1.0 |
| C | 500 | 10.7 | 3.0 | 6 | 1.1 | | | | |
| | | | | 7 | 2.9 | | | | |
| | | | | 8 | 6.6 | | | | |
| | | | | 9 | 1.5 | | | | |
| | | | | 10 | 8.8 | 3.9 | | 1.2 | |
| | | | | 11 | 1.1 | 3.2 | | 1.9 | |
| | | | | 12 | 18.0 | 23.8 | 5.0 | 10.9 | 2.3 |
| | | | | 13 | | 2.5 | | 2.2 | 0.7 |
| | | | | 14 | | | | 0.9 | 0.7 |
| | | | | 15 | | | | 0.5 | 0.5 |

The data given in Table I show the percentages of components having from 6 to 15 carbon atoms and having generic formulas ranging from $C_nH_{2n-6}$ to $C_nH_{2n-14}$. The compounds having less than 12 carbon atoms and a generic formula of $C_nH_{2n-6}$ are alkyl benzenes. Values given for the 12 carbon member of the $C_nH_{2n-6}$ group include any unreacted cyclododecatriene-1,5,9 and also any of its isomers that may have formed. The $C_nH_{2n-8}$ group constitutes tetralins and/or indanes. The other three groups, from left to right in the table, are indenes, naphthalenes and acenaphthenes, respectively.

The data in Table I show that the silica-alumina catalyst at 300° C. causes substantially complete conversion of the starting triene to aromatics which are mainly tetralins, indanes and indenes. As the temperature is raised, more lower molecular weight aromatics are produced, so that at a temperature of 500° C. roughly 20% of the product is alkyl benzenes. The data indicate, however, that the amount of coke formed is substantially independent of the reaction temperature.

EXAMPLE II

Two runs were made at 500° C. in the same manner as described in the preceding example but in this case the catalysts used were, respectively, acid activated kaolin and silica-magnesia. Results are shown in Table II.

example tend to form less alkyl benzenes and more tetralins, indanes and indenes.

EXAMPLE III

Two runs were made at temperatures of 400° and 500° C., respectively, using a commercial chromia-alumina catalyst. Conditions otherwise were as described in Example I. Results are shown in Table III.

*Table III*
REACTION OF CYCLODODECATRIENE-1,5,9 OVER CHROMIA-ALUMINA CATALYST

| Run No. | Reaction temp., ° C. | Gas make, weight percent | Coke make, weight percent | Number of carbon atoms (n) | Liquid product composition, vol. percent |||||
|---|---|---|---|---|---|---|---|---|---|
| | | | | | Generic formula |||||
| | | | | | $C_nH_{2n-6}$ | $C_nH_{2n-8}$ | $C_nH_{2n-10}$ | $C_nH_{2n-12}$ | $C_nH_{2n-14}$ |
| F | 500 | 3.6 | 3.4 | 9 | 1.0 | | | | |
| | | | | 10 | 1.1 | | | 0.6 | |
| | | | | 11 | | | | | |
| | | | | 12 | 23.6 | 35.7 | 29.8 | 7.0 | 1.1 |
| G | 400 | 1.1 | 1.4 | 12 | 4.0 | 61.4 | 18.4 | 14.0 | 2.3 |

The data given in Table III show that chromia-alumina is an excellent catalyst for converting cyclododecatriene without formation of alkyl benzenes. At 400° C. (run G) virtually all of the starting material was converted to tetralins, indanes, indenes and naphthalenes. Molybdenum oxide-alumina catalysts function in substantially the same way as chromia-alumina.

*Table II*
REACTION OF CYCLODODECATRIENE-1,5,9 OVER KAOLIN AND SILICA-MAGNESIA CATALYSTS AT 500° C.

| Run No. | Catalyst | Gas make, weight percent | Coke make, weight percent | Number of carbon atoms (n) | Liquid product composition, vol. percent |||||
|---|---|---|---|---|---|---|---|---|---|
| | | | | | Generic formula |||||
| | | | | | $C_nH_{2n-6}$ | $C_nH_{2n-8}$ | $C_nH_{2n-10}$ | $C_nH_{2n-12}$ | $C_nH_{2n-14}$ |
| D | Kaolin | 6.6 | 2.7 | 6 | 0.7 | | | | |
| | | | | 7 | 1.6 | | | | |
| | | | | 8 | 3.0 | | | | |
| | | | | 9 | 0.8 | | | | |
| | | | | 10 | 5.8 | 3.6 | | 0.3 | |
| | | | | 11 | 0.7 | 2.8 | | 0.7 | |
| | | | | 12 | 17.7 | 32.3 | 13.1 | 7.7 | 3.8 |
| | | | | 13 | | 2.4 | | 0.8 | 0.6 |
| | | | | 14 | | | | 0.7 | 0.4 |
| | | | | 15 | | | | 0.2 | 0.3 |
| E | Silica-magnesia | 8.1 | 2.9 | 7 | 1.7 | | | | |
| | | | | 8 | 2.7 | | | | |
| | | | | 9 | 1.1 | | | | |
| | | | | 10 | 4.7 | 4.2 | | 0.8 | |
| | | | | 11 | 0.7 | 3.3 | | 1.7 | |
| | | | | 12 | 16.6 | 38.1 | 13.8 | 7.0 | 1.0 |
| | | | | 13 | | | | 0.8 | 0.9 |
| | | | | 14 | | | | 0.4 | 0.5 |

Comparison of the results listed in Table II with data from the first example show that the catalytic effects of kaolin and silica-magnesia are substantially similar to silica-aluminum, except that the catalysts of the present

EXAMPLE IV

Two runs were made as in the preceding example but using a commercial platinum-alumina reforming catalyst. Table IV shows the results.

*Table IV*
REACTION OF CYCLODODECATRIENE-1,5,9 OVER PLATINUM-ALUMINA CATALYST

| Run No. | Reaction temp., ° C. | Gas make, weight percent | Coke make, weight percent | Number of carbon atoms (n) | Liquid product composition, vol. percent |||||
|---|---|---|---|---|---|---|---|---|---|
| | | | | | Generic formula |||||
| | | | | | $C_nH_{2n-6}$ | $C_nH_{2n-8}$ | $C_nH_{2n-10}$ | $C_nH_{2n-12}$ | $C_nH_{2n-14}$ |
| H | 500 | 7.2 | 7.9 | 8 | 1.0 | | | | |
| | | | | 9 | 0.9 | | | | |
| | | | | 10 | 2.8 | 3.1 | 1.6 | 0.8 | |
| | | | | 11 | | 1.9 | 1.8 | 0.7 | |
| | | | | 12 | 11.5 | 32.7 | 23.7 | 12.2 | 2.9 |
| | | | | 13 | | | 1.8 | 0.5 | |
| J | 400 | 4.1 | 4.3 | 10 | | 3.2 | | | |
| | | | | 11 | | 1.3 | | 0.3 | |
| | | | | 12 | 3.6 | 55.2 | 22.5 | 7.5 | 6.4 |

The data of Table IV show that platinum-alumina reforming catalysts act somewhat intermediate of the chromia-alumina catalysts and the catalysts specified in Examples I and II but that the selectivity for forming tetralins, indanes, indenes and naphthalenes is high.

While all of the foregoing runs were made at substantially atmospheric pressure, the process can be practiced, if desired, at elevated pressure, for example, at pressures up to 500 p.s.i.g., and generally similar results will be obtained.

I claim:

1. Method of forming aromatic hydrocarbons which comprises contacting cyclododecatriene-1,5,9 in vapor phase with a catalyst selected from the group consisting of acidic siliceous cracking catalysts, chromia-alumina, molybdenum oxide-alumina, cobalt molybdate and platinum-alumina at a temperature in the range of 200–600° C. and at a space velocity of 0.2–5.0 volume liquid per bulk volume catalyst per hour.

2. Method according to claim 1 wherein the catalyst is an acidic siliceous cracking catalyst, the temperature is in the range of 250–400° C. and the space velocity is 0.5–3.0.

3. Method according to claim 1 wherein the catalyst is chromia-alumina, the temperature is in the range of 300–500° C. and the space velocity is 0.5–3.0.

4. Method according to claim 1 wherein the catalyst is platinum-alumina, the temperature is in the range of 300–450° C. and the space velocity is 0.5–3.0.

References Cited in the file of this patent

UNITED STATES PATENTS

| | | |
|---|---|---|
| 2,962,536 | Pitts | Nov. 29, 1960 |
| 2,972,644 | Holmes et al. | Feb. 21, 1961 |